(12) United States Patent  
Santoh

(10) Patent No.: US 6,636,204 B2  
(45) Date of Patent: Oct. 21, 2003

(54) PEN-BASED ENTRY ELECTRONIC DEVICE

(75) Inventor: Yoshihisa Santoh, Souraku-Gun (JP)

(73) Assignee: Sharp Kabushiki Kaisha, Osaka (JP)

( * ) Notice: Subject to any disclaimer, the term of this patent is extended or adjusted under 35 U.S.C. 154(b) by 254 days.

(21) Appl. No.: 09/835,416

(22) Filed: Apr. 17, 2001

(65) Prior Publication Data

US 2001/0033276 A1 Oct. 25, 2001

(30) Foreign Application Priority Data

Apr. 19, 2000 (JP) ........................................ 2000-117352

(51) Int. Cl.⁷ ................................................ G09G 5/00
(52) U.S. Cl. ........................ 345/179; 345/169; 345/173; 345/905; 361/680
(58) Field of Search ................................ 345/173–183, 345/156–169, 905; 361/680–687; 178/18.01–18.11, 19.01–19.07; 713/300–324

(56) References Cited

U.S. PATENT DOCUMENTS

| | | | | |
|---|---|---|---|---|
| 5,179,502 A | * | 1/1993 | Matsuda | 361/392 |
| 5,375,076 A | * | 12/1994 | Goodrich et al. | 361/680 |
| 5,414,444 A | * | 5/1995 | Britz | 345/156 |
| 5,646,649 A | * | 7/1997 | Iwata et al. | 345/173 |
| 6,028,764 A | * | 2/2000 | Richardson et al. | 361/681 |
| 6,044,473 A | * | 3/2000 | Kim | 713/320 |
| 6,047,196 A | * | 4/2000 | Makela et al. | 455/556 |
| 6,154,359 A | * | 11/2000 | Kamikakai et al. | 361/681 |
| 6,249,276 B1 | * | 6/2001 | Ohno | 345/173 |
| 6,266,240 B1 | * | 7/2001 | Urban et al. | 361/686 |
| 6,507,336 B1 | * | 1/2003 | Lunsford | 345/168 |

FOREIGN PATENT DOCUMENTS

| | | |
|---|---|---|
| JP | 61-235922 | 10/1986 |
| JP | 3-176714 | 7/1991 |

* cited by examiner

*Primary Examiner*—Lun-Yi Lao  
(74) *Attorney, Agent, or Firm*—Nixon & Vanderhye P.C.

(57) ABSTRACT

A pen-based entry electronic device has a body having a holder portion for holding a pen that is carried along with the body and a keyboard having an engagement portion that engages with the holder portion. The body and the keyboard are connected together electrically via a connection cable. Alternatively, the body and the keyboard are connected together electrically via infrared communication. Alternatively, the holder portion and the engagement portion are each provided with connection terminals so that, when the engagement portion engages with the holder portion, the connection terminals make contact with each other to connect the body and the keyboard together electrically.

21 Claims, 20 Drawing Sheets

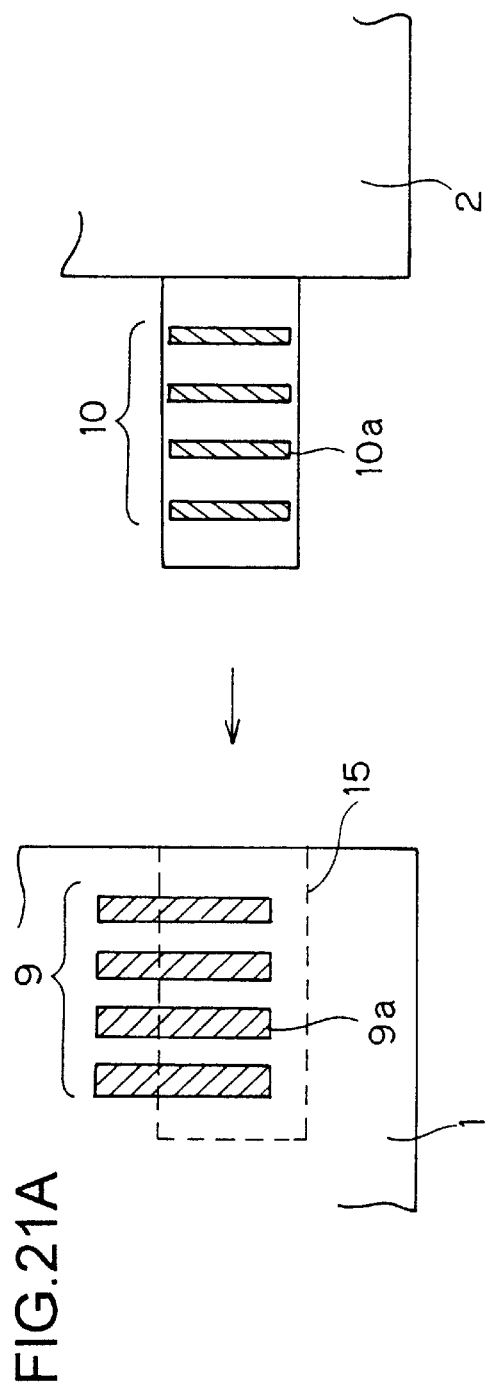
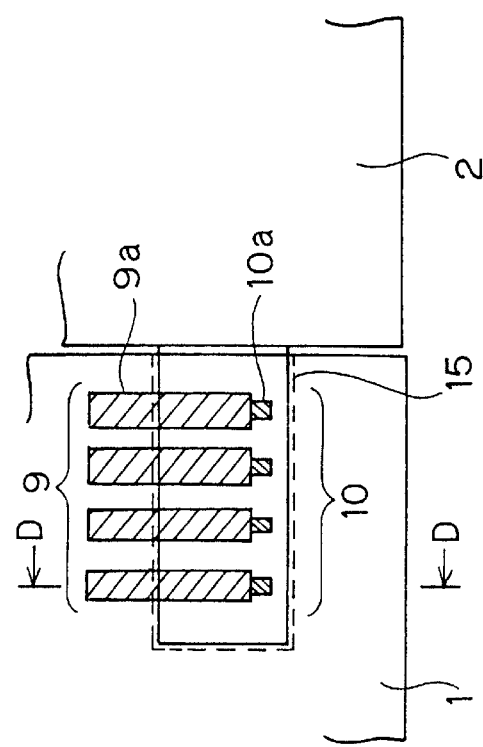
FIG.21A
FIG.21B

US 6,636,204 B2

PEN-BASED ENTRY ELECTRONIC DEVICE

This application is based on Japanese Patent Application No. 2000-117352 filed on Apr. 19, 2000, the contents of which are hereby incorporated by reference.

BACKGROUND OF THE INVENTION

1. Field of the Invention

The present invention relates to a pen-based entry electronic device to which a keyboard can be detachably fitted.

2. Description of the Prior Art

Conventionally, various arrangements are known that permit a keyboard to be detachably fitted to the body of an electronic device. For example, Japanese Patent Application Laid-Open No. S61-235922 discloses an arrangement in which a control device chassis and an input device chassis are provided with a coupling member that permits them to engage with each other so that the control device chassis and the input device chassis can be detachably fitted together. That is, this prior-art document discloses a connector arrangement that permits a keyboard to be detachably fitted to the body of an electronic device.

On the other hand, Japanese Patent Application Laid-Open No. H3-176714 discloses an arrangement including a keyboard type identifying device that identifies the type of a keyboard and a signal path switching device that switches the path of the data fed from the keyboard according to the type of the keyboard identified by the keyboard type identifying device. That is, this prior-art document discloses an arrangement that permits a plurality of keyboards to be connected to a single data processing device (e.g. a personal computer).

In a conventional pen-based entry electronic device, entry of commands and data is achieved by the use of a data entry pen (stylus) that comes along with the body of the electronic device, i.e. through hand writing and touching on a keyboard screen using the pen. However, in recent years, as personal computers prevail, an increasing number people familiar with keyboard-based entry have been expressing a demand for keyboard-based entry capability even with pen-based entry electronic devices. In such cases, it is customary to permit keyboard-based entry by connecting an optional keyboard to a pen-based entry electronic device via a cable.

However, the arrangement of the conventional pen-based entry electronic device described just above, and also the arrangement disclosed in Japanese Patent Application Laid-Open No. H3-176714 mentioned above, simply connects the keyboard to the body of the electronic device by the use of a connector or the like, and thus gives no consideration to integrating the body of the electronic device and the keyboard together. On the other hand, the arrangement disclosed in Japanese Patent Application Laid-Open No. S61-235922 mentioned above does give consideration to integrating the body of the electronic device and the keyboard together, but requires the provision of a special connector arrangement, which makes the overall scale of the electronic device unduly large.

SUMMARY OF THE INVENTION

An object of the present invention is to provide a pen-based entry electronic device that, despite having a simple structure, permits a keyboard to be not only detachably fitted thereto but also readily integrated therewith.

To achieve the above object, according to the present invention, a pen-based entry electronic device is provided with a body having a holder portion for holding a pen that is carried along with the body and a keyboard having an engagement portion that engages with the holder portion. The body and the keyboard are connected together electrically via a connection cable. Alternatively, the body and the keyboard are connected together electrically via infrared communication. Alternatively, the holder portion and the engagement portion are each provided with connection terminals so that, when the engagement portion engages with the holder portion, the connection terminals make contact with each other to connect the body and the keyboard together electrically.

BRIEF DESCRIPTION OF THE DRAWINGS

This and other objects and features of the present invention will become clear from the following description, taken in conjunction with the preferred embodiments with reference to the accompanying drawings in which:

FIGS. 21A and 21B are diagrams conceptually showing the electrical connection achieved in FIGS. 20A to 20D;

DESCRIPTION OF THE PREFERRED EMBODIMENTS

Figure 1A:
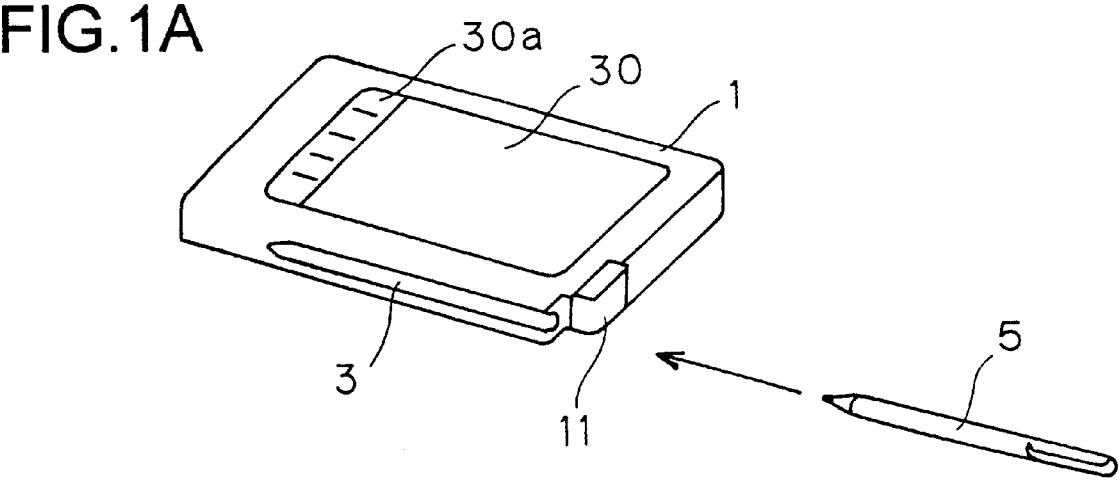
FIGS. 1A and 1B are external perspective views of the body of the pen-based entry electronic device of a first embodiment of the invention.
Figure 1B:
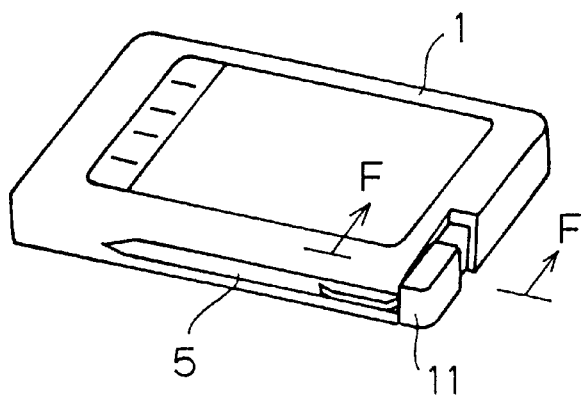

Hereinafter, embodiments of the present invention will be described with reference to the drawings. FIGS. 1A and 1B are external perspective views of the body of the pen-based entry electronic device of a first embodiment of the invention. In FIGS. 1A and 1B, reference numeral 1 represents the body having substantially the shape of a panel, reference numeral 3 represents a pen holder slot formed along one side of the body 1, reference numeral 5 represents a pen that is carried along with the body 1, and reference numeral 11 represents a sliding stopper provided at a corner of the body 1. The body 1 is provided with, in the surface thereof, a display portion 30 including a tablet 30a for pen-based entry, and incorporates, although not illustrated, electronic circuits for controlling the electronic device, a battery for supplying electric power needed to drive those electronic circuits, and other components.

The pen holder slot 3 is formed as a hollow having a shape that fits the external shape of the pen 5, and the tip portion of the pen holder slot 3 tapers off just like the tip portion of the pen 5. The pen holder slot 3 is so shaped that, when the pen 5 is held therein, part of the pen 5 shows.

Figure 2:
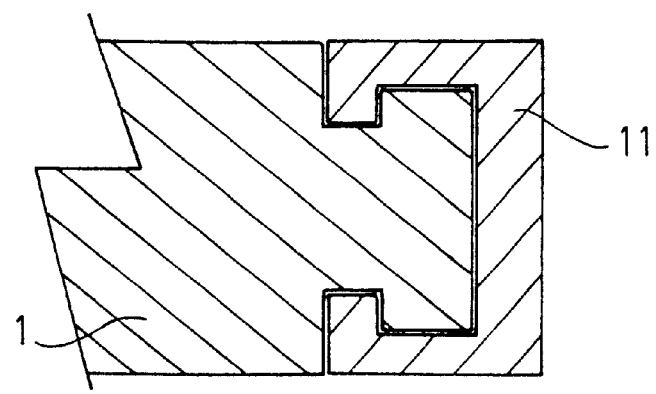
FIG. 2 is a sectional view taken along line F—F shown in FIG. 1B.

For example, as shown in FIG. 1A, the pen 5 is inserted in the pen holder slot 3 in the direction indicated by an arrow. Then, as shown in FIG. 1B, the sliding stopper 11 is slid forward to prevent the pen 5 from dropping out. FIG. 2 is a sectional view taken along line F—F shown in FIG. 1B. In this way, the sliding stopper 11 is slidably fitted on the body 1. The stopper 11, however, may be of any other type than a slidable type like this; for example, it may be a rotary type like the one described later.

Figure 3A:
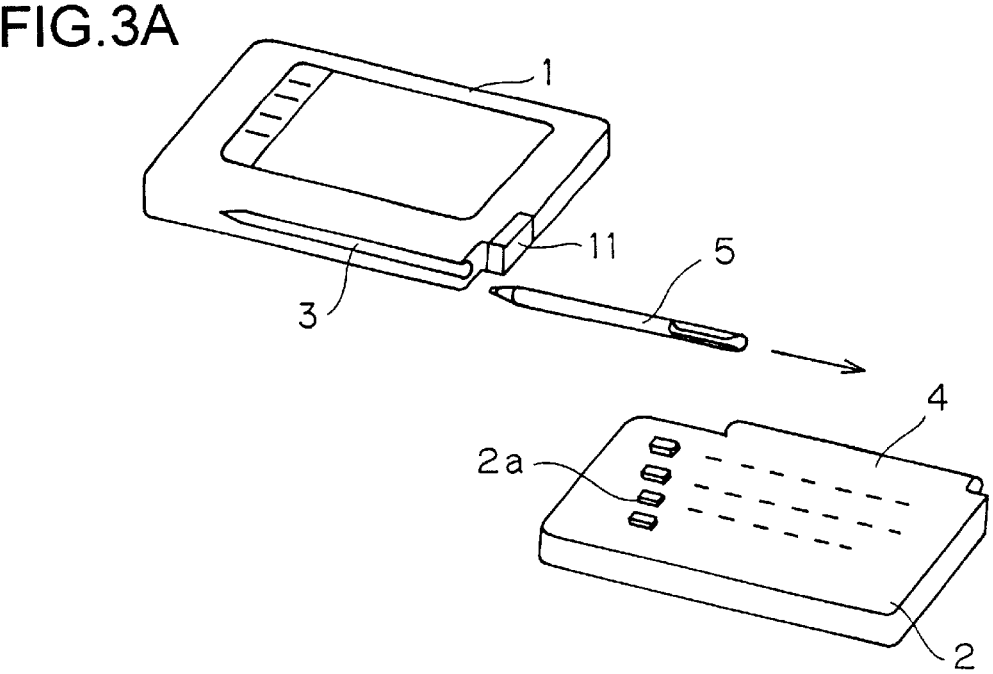
FIGS. 3A and 3B are external perspective views showing how the keyboard is detachably fitted to the body in the first embodiment.
Figure 3B:
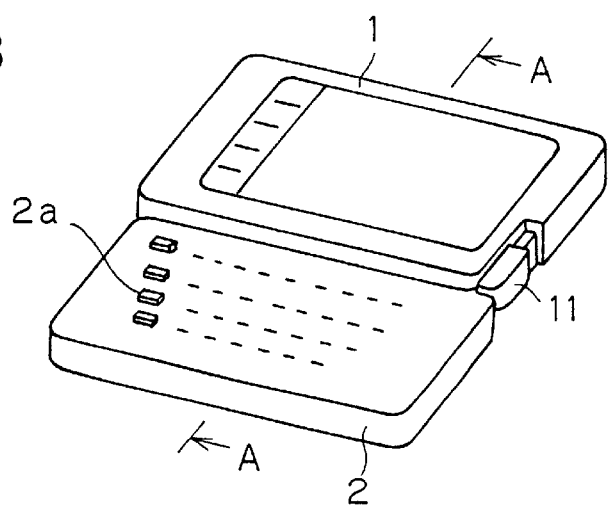

FIGS. 3A and 3B are external perspective views showing how the keyboard is detachably fitted to the body in the pen-based entry electronic device of this embodiment. Here, reference numeral 2 represents a keyboard having various keys 2a provided in the surface thereof and having substantially the shape of a panel. The keyboard 2 is fitted to the body 1 in the following manner. First, as shown in FIG. 3A, the sliding stopper 11 is slid backward, and the pen 5 is taken out of the pen holder slot 3 as indicated by an arrow.

Figure 4:
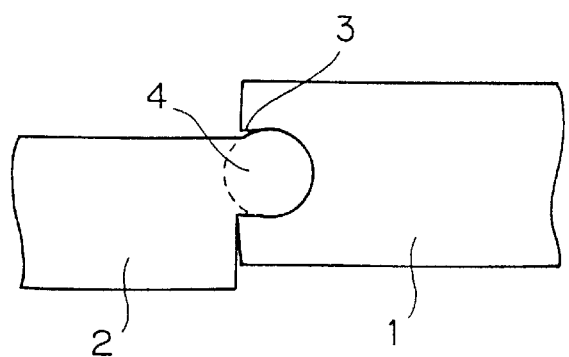
FIG. 4 is a sectional view taken along line A—A shown in FIG. 3B.

Next, a fitting portion 4 formed along one side of the keyboard 2 is inserted in the pen holder slot 3. Lastly, as shown in FIG. 3B, the sliding stopper 11 is slid forward to prevent the keyboard 2 from dropping off FIG. 4 is a sectional view taken along line A—A shown in FIG. 3B. This sectional view shows how, instead of the pen 5, the fitting portion 4 of the keyboard 2 is held in the pen holder slot 3 of the body 1.

Figure 5A:
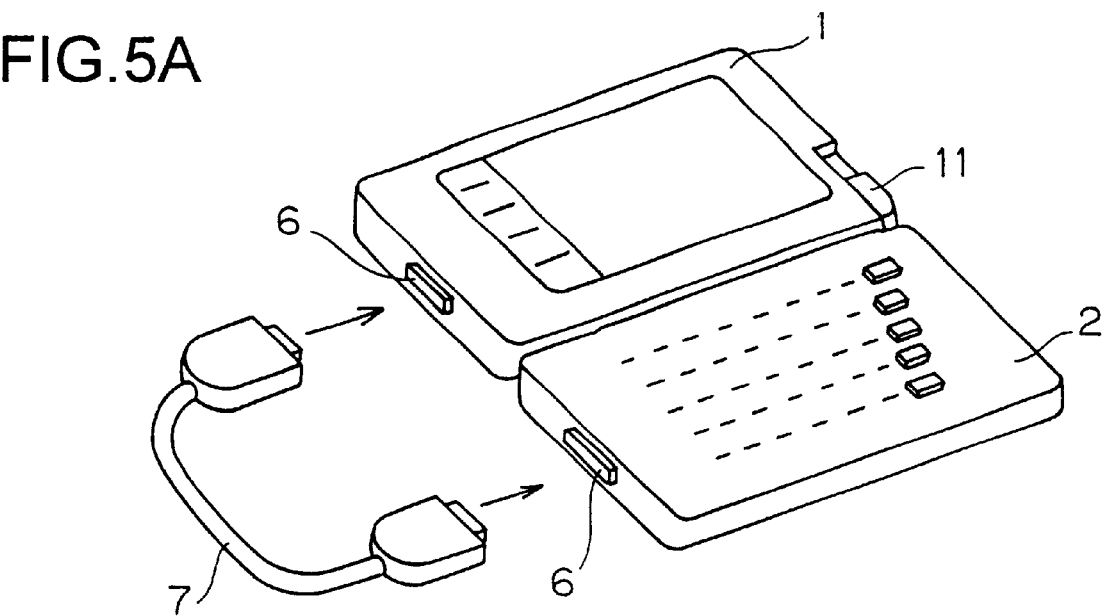
FIGS. 5A and 5B are external perspective views showing an example of how electrical connection is achieved in the first embodiment.
Figure 5B:
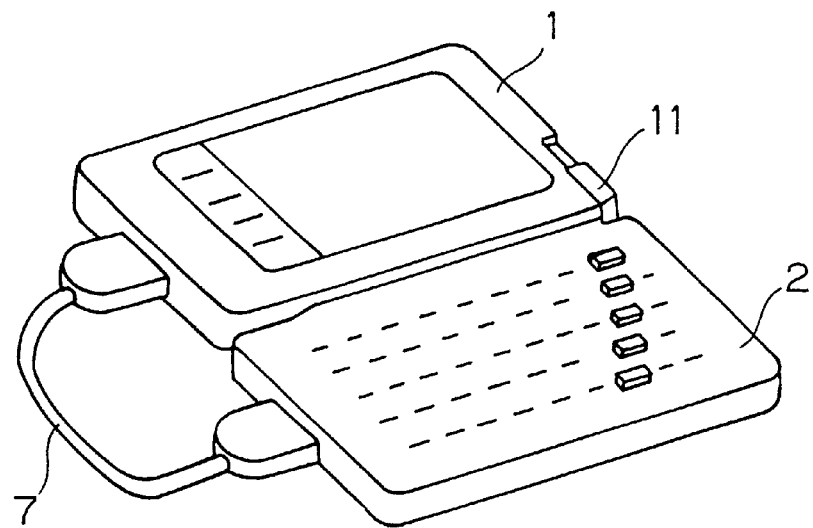

FIGS. 5A and 5B are external perspective views showing an example of how electrical connection is achieved in the pen-based entry electronic device of this embodiment. As shown in FIG. 5A, the body 1 and the keyboard 2 are connected together electrically via a connection cable 7 that, as indicated by arrows, plugs into connectors 6 provided individually in the sides of the body 1 and the keyboard 2. FIG. 5B shows how the connection cable 7 plugs into the connectors 6. The connectors 6 may be provided in any other positions than specifically shown in FIGS. 5A and 5B as long as they achieve the desired electrical connection and do not hamper the operation of the electronic device.

Figure 6:
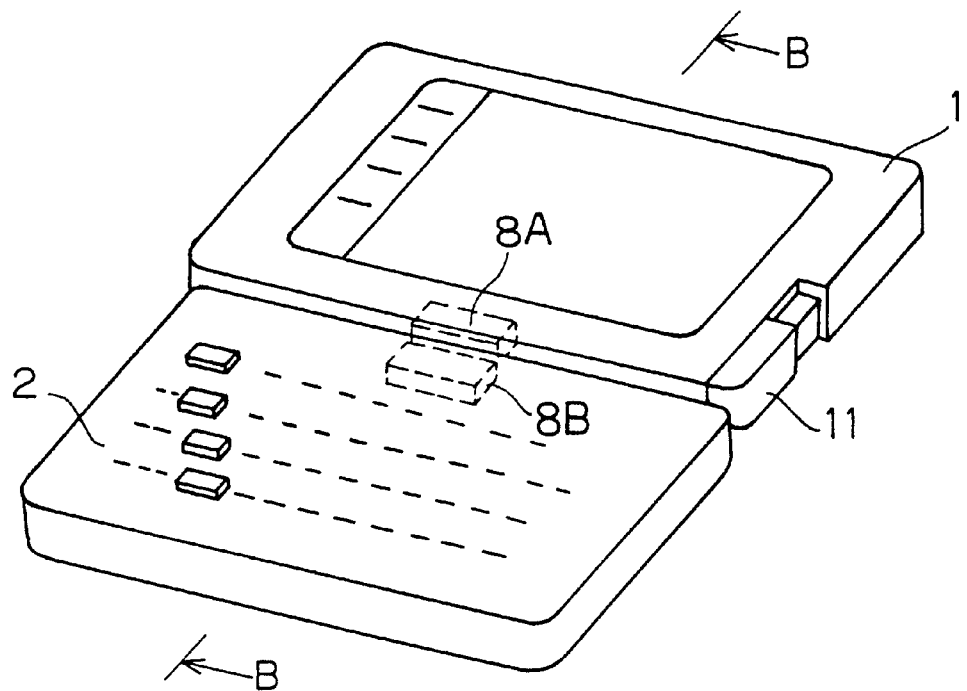
FIG. 6 is an external perspective view showing another example of how electrical connection is achieved in the first embodiment.

FIG. 6 is an external perspective view showing another example of how electrical connection is achieved in the pen-based entry electronic device of this embodiment. As shown in FIG. 6, an IR (infrared) unit 8A provided in the side of the body 1 and an IR unit 8B provided in the side of the keyboard 2 face each other, and thereby connect the body 1 and the keyboard 2 together electrically. That is, the IR units 8A and 8B communicate with each other by exchanging infrared rays between them, and thereby connect the body 1 and the keyboard 2 together electrically.

Figure 7:
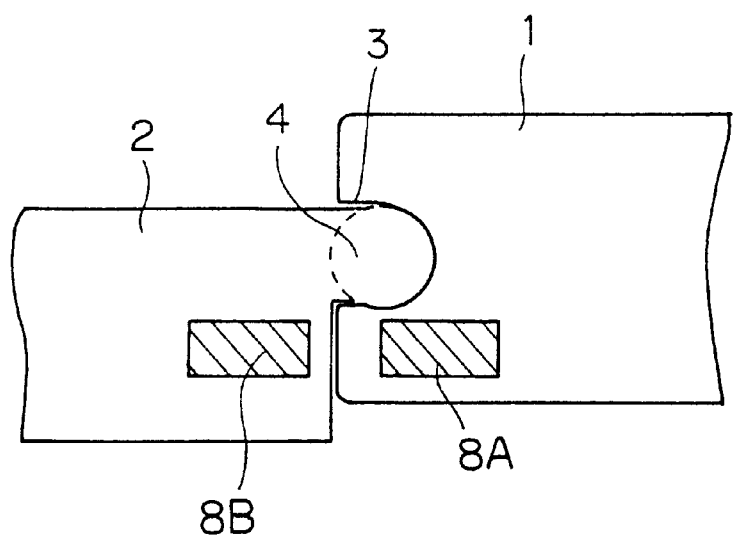
FIG. 7 is a sectional view taken along line B—B shown in FIG. 6.

The IR units 8A and 8B may be provided in any other positions than specifically shown in FIG. 6 as long as they achieve the desired electrical connection and do not hamper the operation of the electronic device. FIG. 7 is a sectional view taken along line B—B shown in FIG. 6. This sectional view shows how the IR units 8A and 8B are provided individually in the body 1 and the keyboard 2.

Figure 8A:
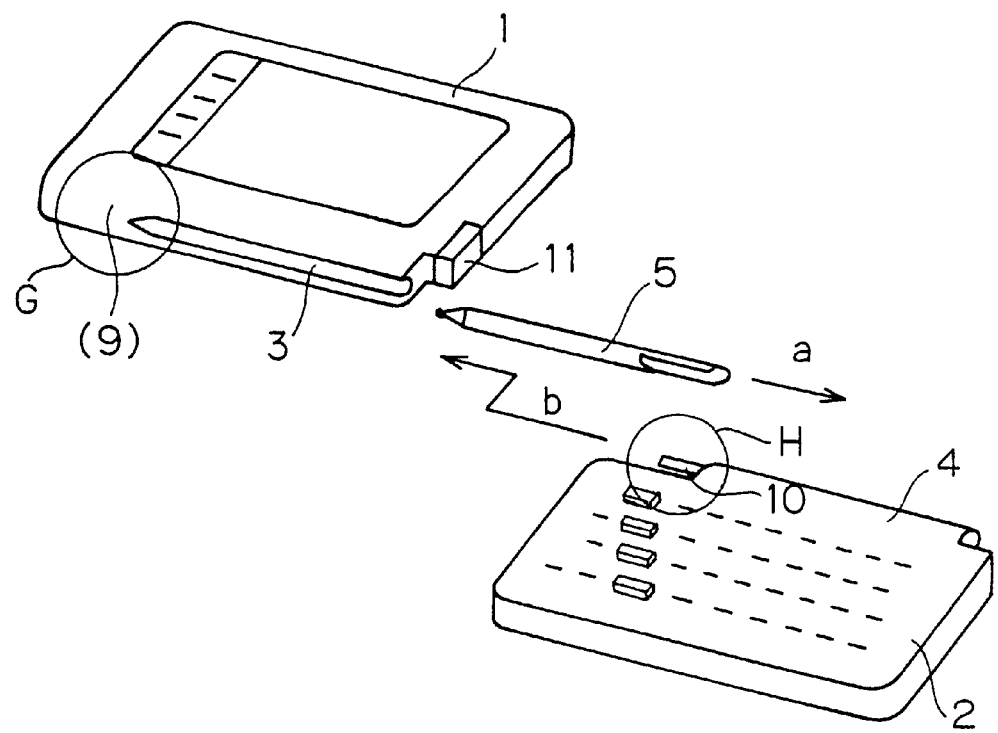
FIGS. 8A and 8B are external perspective views showing still another example of how electrical connection is achieved in the first embodiment.
Figure 8B:
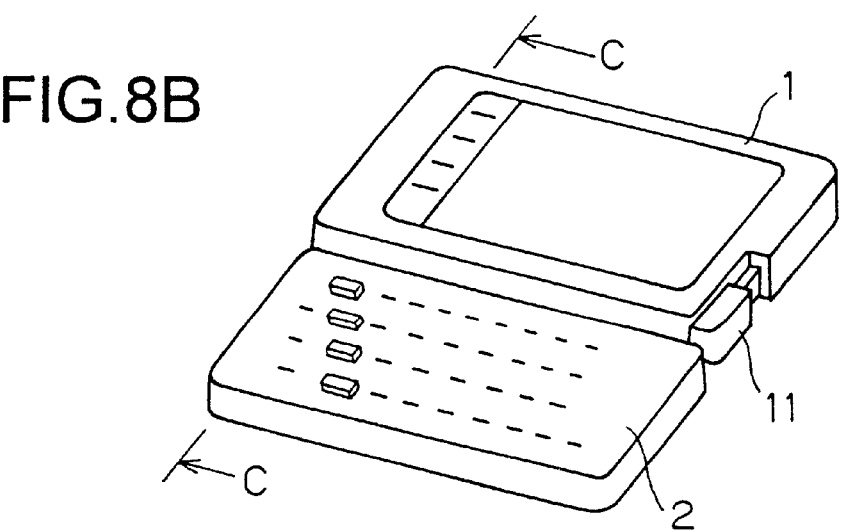

FIGS. 8A and 8B are external perspective views showing still another example of how electrical connection is achieved in the pen-based entry electronic device of this embodiment. As shown in FIGS. 8A, 8B, 9A, and 9B, in this example, electrical connection is achieved as a result of a connection terminal portion 9 formed near the tip portion of the pen holder slot 3 of the body 1 making contact with a connection terminal portion 10 formed in the tip portion of the fitting portion 4 of the keyboard 2. The keyboard 2 is fitted to the body 1 in the following manner.

First, as shown in FIG. 8A, the sliding stopper 11 is slid backward, and the pen 5 is taken out of the pen holder slot 3 as indicated by an arrow "a". Next, the fitting portion 4 formed along one side of the keyboard 2 is inserted in the pen holder slot 3 as indicated by an arrow "b". Lastly, as shown in FIG. 8B, the sliding stopper 11 is slid forward to prevent the keyboard 2 from dropping out.

Figure 9A:
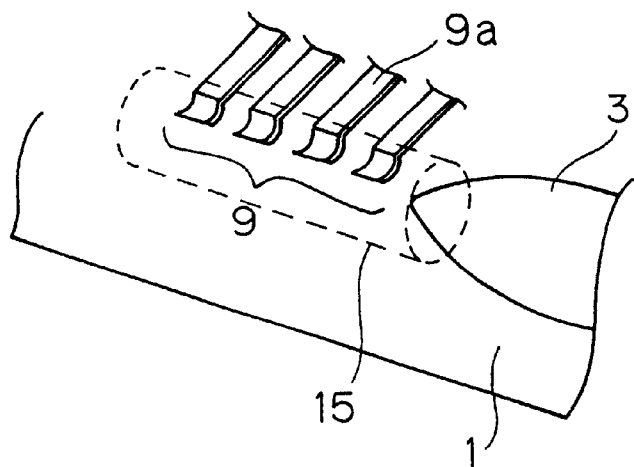
FIGS. 9A and 9B are diagrams showing the connection terminal portions in detail.
Figure 9B:
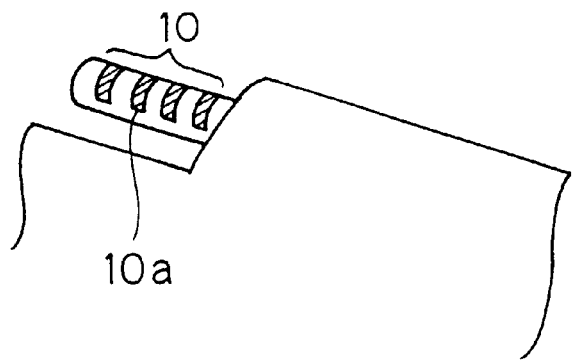

FIGS. 9A and 9B are respectively detail views of the encircled portion G of the inside of the body 1 and the encircled portion H around the tip portion of the fitting portion 4 shown in FIG. 8A. When the keyboard 2 is fitted to the body 1, individual terminals 9a provided in the connection terminal portion 9 as shown in FIG. 9A make contact with individual terminals 10a provided in the connection terminal portion 10 as shown in FIG. 9B. This permits electrical connection to be achieved simply by taking the pen 5 out of the body 1 and instead fitting the keyboard 2 thereto. In this case, the keyboard 2 incorporates an IC so that key-based entry is possible with as few as four connection terminals. Reference numeral 15 represents a body-side coupling portion, indicated with broken lines, formed in the body 1 to permit the connection terminal portion 10 to fit into it.

Figure 10:
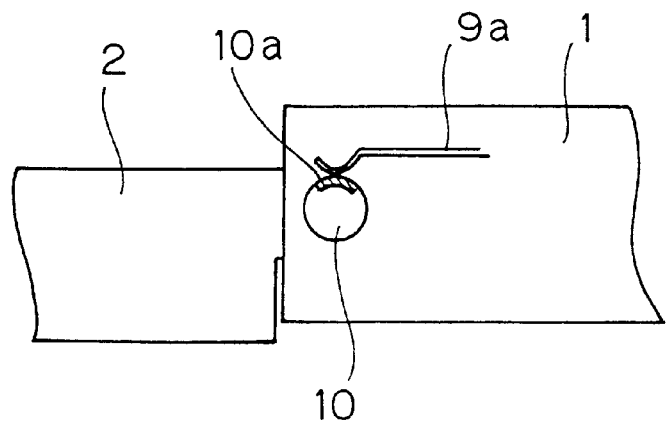
FIG. 10 is a sectional view taken along line C—C shown in FIG. 8B.

FIG. 10 is a sectional view taken along line C—C shown in FIG. 8B. This sectional view shows how the individual terminals 9a and 10a provided in the connection terminal portions 9 and 10 of the body 1 and the keyboard 2 make contact with each other. The connection terminal portion 10 is illustrated as being circular in its cross section in the figure, but does not necessarily have to be so, because, in this case, the keyboard 2 need not be rotatable with respect to the body 1. The terminals 9a provided in the connection terminal portion 9 are formed as metal contacts shaped like flat springs, but may be formed in any other manner as long as they achieve electrical connection.

Figure 11A:
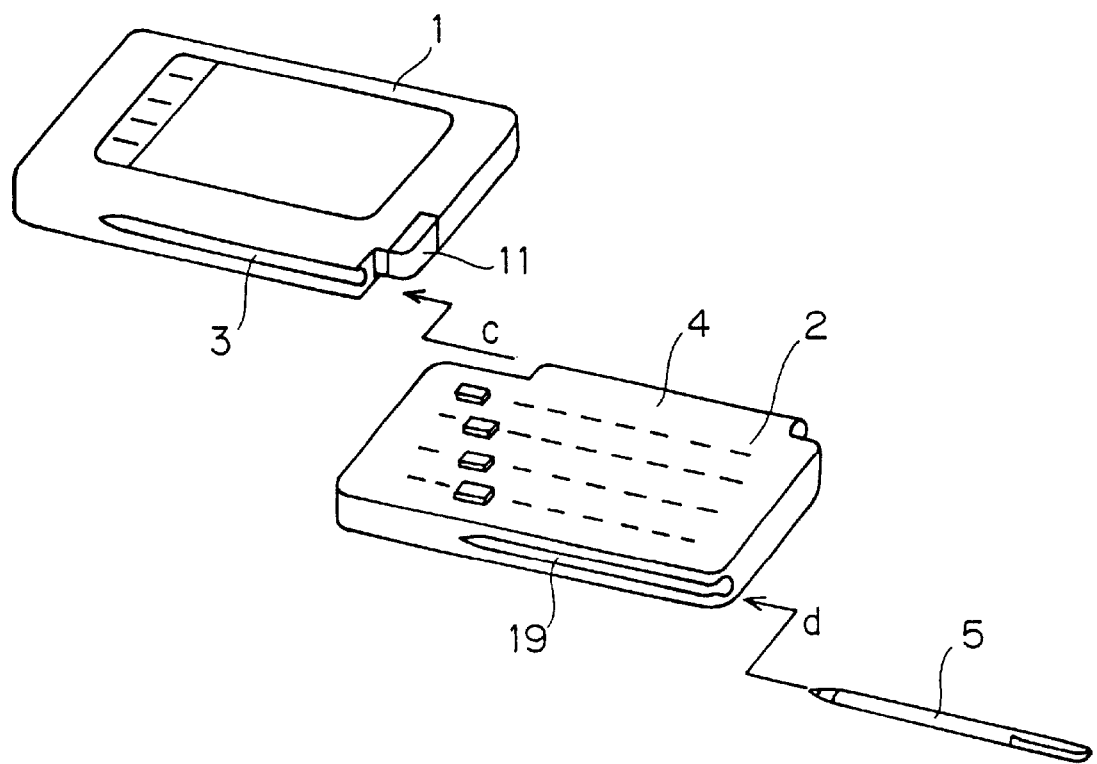
FIGS. 11A and 11B are external perspective views showing an example of how the pen is held in the first embodiment.
Figure 11B:
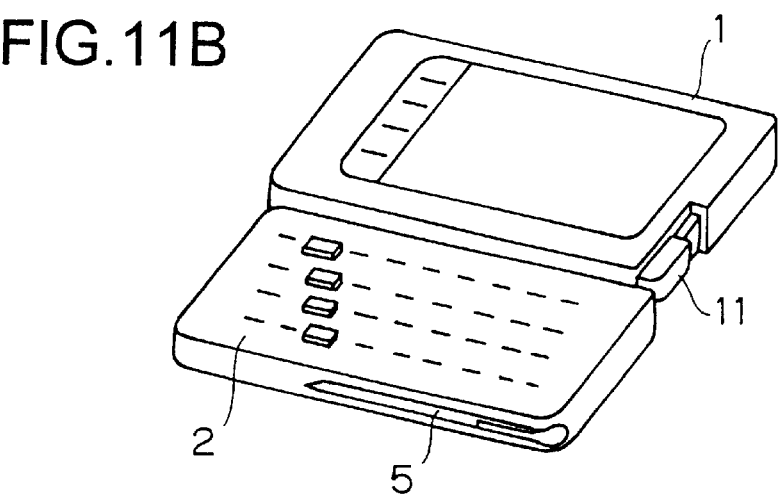

FIGS. 11A and 11B are external perspective views showing an example of how the pen is held in the pen-based entry electronic device of this embodiment. In FIG. 11A, when the keyboard 2 is fitted to the body 1, as described previously, the fitting portion 4 formed along one side of the keyboard 2 is inserted in the pen holder slot 3 as indicated by an arrow "c". Then, as shown in FIG. 11B, the sliding stopper 11 is slid forward to prevent the keyboard 2 from dropping out.

Now, the pen 5 taken out of the pen holder slot 3 is held, as indicated by an arrow "d", in a pen holder space 19 formed along the side of the keyboard 2 opposite to the fitting portion 4 thereof FIG. 11B shows how the pen 5 is held there. The pen holder space 19 may be formed in any other position in the keyboard 2 than specifically shown in FIG. 11A as long as it does not hamper the operation of the electronic device.

FIGS. 12A to 12D are external perspective views showing how the keyboard is detachably fitted to the body in the pen-based entry electronic device of a second embodiment of the invention. In FIGS. 12A to 12D, reference numeral 1 represents the body having substantially the shape of a panel, reference numeral 3 represents a pen holder slot formed along one side of the body 1, reference numeral 5 represents a pen that is carried along with the body 1, and reference numeral 12 represents a rotary stopper provided at a corner of the body 1. The body 1 is provided with, in the surface thereof, a display portion 30 including a tablet 30a for pen-based entry, and incorporates, although not illustrated, electronic circuits for controlling the electronic device, a battery for supplying electric power needed to drive those electronic circuits, and other components.

Figure 12A:
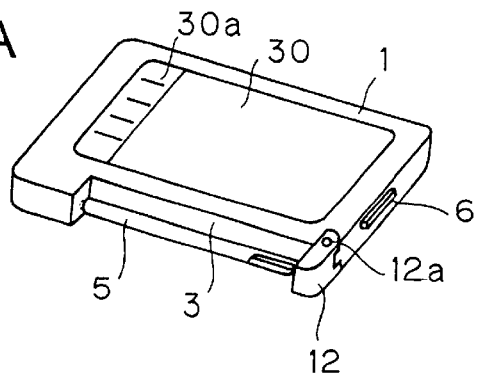
FIGS. 12A to 12D are external perspective views showing how the keyboard is detachably fitted to the body in the pen-based entry electronic device of a second embodiment of the invention.
Figure 12B:
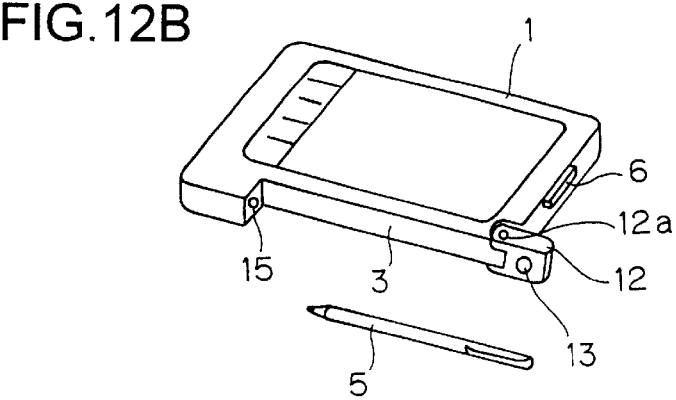

As shown in FIG. 12A, the pen 5 is held in the pen holder slot 3 by being sandwiched between the body 1 and the rotary stopper 12. To remove the pen 5, as shown in FIG. 12B, the rotary stopper 12 is rotated through 90 degrees about its rotation shaft 12a to release the pen 5. Here, reference numeral 15 represents a body-side coupling portion formed as a circular hole in the body 1, and reference numeral 13 represents a circular depression formed in the rotary stopper 12. When the pen 5 is held, the two ends thereof are respectively inserted in the body-side coupling portion 15 and the circular depression 13.

Figure 12C:
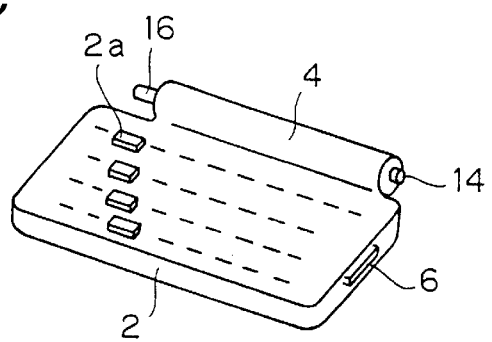

On the other hand, as shown in FIG. 12C, the keyboard 2 has various keys 2a provided in the surface thereof and has substantially the shape of a panel. The keyboard 2 has a fitting portion 4 formed along one side thereof. At one end of the fitting portion 4, a keyboard-side coupling portion 16 is formed as a cylindrical projection, and, at the other end of the fitting portion 4, a circular projection 14 is formed, both so as to extend from the respective ends of the fitting portion 4 outward. When the keyboard 2 is fitted to the body 1, first, with the pen 5 removed as shown in FIG. 12B, the keyboard-side coupling portion 16 extending from one end of the fitting portion 4 of the keyboard 2 shown in FIG. 12C is inserted into the body-side coupling portion 15.

Figure 12D:
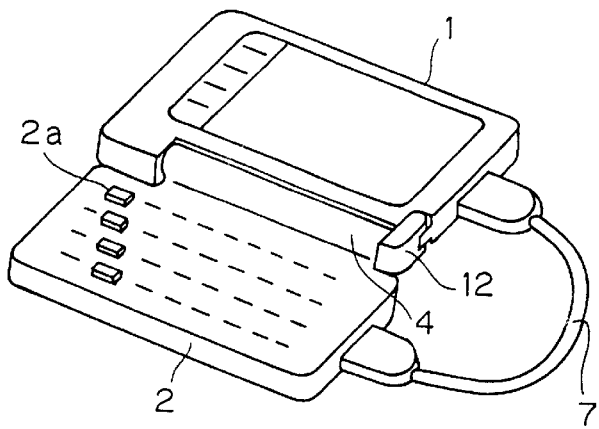

Then, the rotary stopper 12 is rotated through 90 degrees so that the circular projection 14 extending from the other end of the fitting portion 4 of the keyboard 2 is fitted into the circular depression 13 formed in the rotary stopper 12. In this state, the body-side coupling portion 15 and the circular depression 13 function as brackets for rotatably supporting the keyboard-side coupling portion 16 and the circular projection 14 respectively. Lastly, the body 1 and the keyboard 2 are connected together electrically via a connection cable 7 that plugs into connectors 6 provided individually in the sides of the body 1 and the keyboard 2. FIG. 12D shows how the connection cable 7 plugs into the connectors 6. The connectors 6 may be provided in any other positions than specifically shown in FIGS. 12A to 12D as long as they achieve the desired electrical connection and do not hamper the operation of the electronic device.

Thus, the keyboard 2 is rotatable with respect to the body 1 so that they can be folded together. In this state, the keyboard-side coupling portion 16 and the circular projection 14, which function as rotation shafts, are fitted into the body-side coupling portion 15 and the circular depression 13 respectively. Here, giving a tight fit to one or both of these joints makes it possible to adjust the angle between the body 1 and the keyboard 2 and keep them folded together. This makes the body 1 with the keyboard 2 fitted thereto compact enough as a whole to be carried in a bag or the like.

Such angle adjustment may be achieved by any other means than through tight-fit coupling. For example, angle adjustment is possible by the use of hinge units with springs as those employed in notebook personal computers.

Figure 13A:
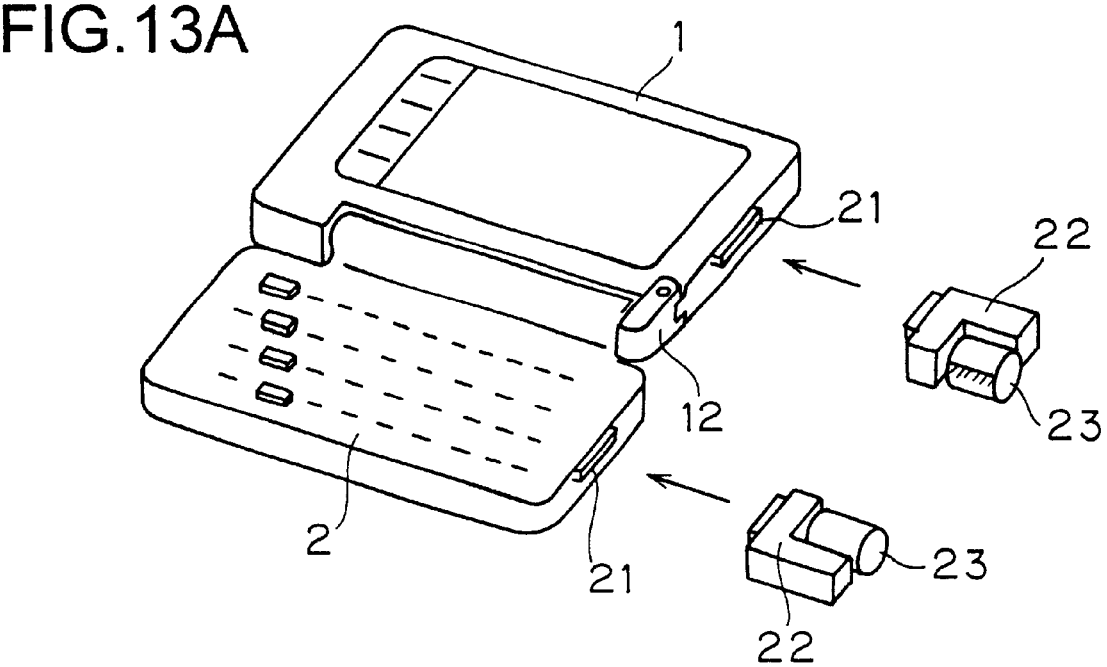
FIGS. 13A and 13B are external perspective views showing an example of how electrical connection is achieved using IR units in the second embodiment.
Figure 13B:
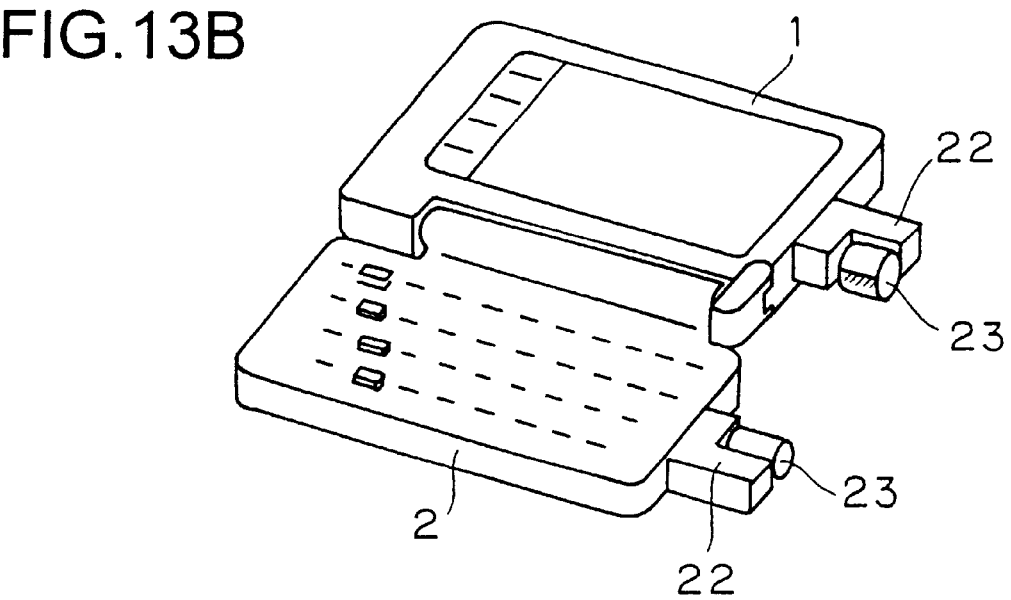

FIGS. 13A and 13B are external perspective views showing an example of how electrical connection is achieved using IR units in the pen-based entry electronic device of this embodiment. Here, as shown in FIG. 13A, IR units 22 are attached, as indicated by arrows, to IR unit connectors 21 provided individually in the sides of the body 1 and the keyboard 2. FIG. 13B shows how the IR units 22 are attached to the IR unit connectors 21. The IR units 22 each have an IR emitter/sensor portion formed as a rotatable portion 23. The rotatable portions 23 of these IR units 22 communicate with each other through the exchange of infrared rays between them, and this permits the body 1 and the keyboard 2 to be connected together electrically.

Figure 14A:
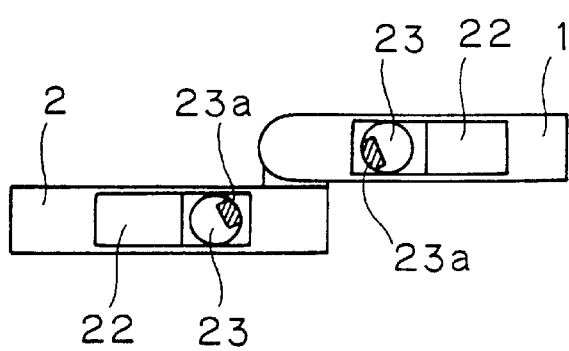
FIGS. 14A and 14B are external perspective views showing the electrical connection achieved by the IR units shown in FIGS. 13A and 13B.
Figure 14B:
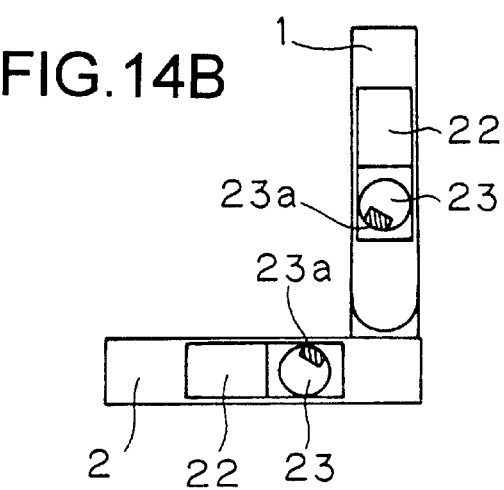

FIGS. 14A and 14B are external perspective views showing the electrical connection achieved by these IR units. FIG. 14A shows the body 1 and the keyboard 2 completely unfolded, and FIG. 14B shows the body 1 and the keyboard 2 unfolded to 90 degrees. As shown in these figures, when the body 1 is used at the desired angle, to make infrared communication possible, the rotatable portions 23 of the IR units 22 attached individually to the body 1 and the keyboard 2 are manually rotated so that their respective windows 23a face each other to suit the angle at which the body 1 is used. The connectors 21 may be provided in any other positions than specifically shown in FIGS. 13A and 13B as long as they achieve the desired electrical connection and do not hamper the operation of the electronic device; for example, they may be provided on the opposite side.

Figure 15A:
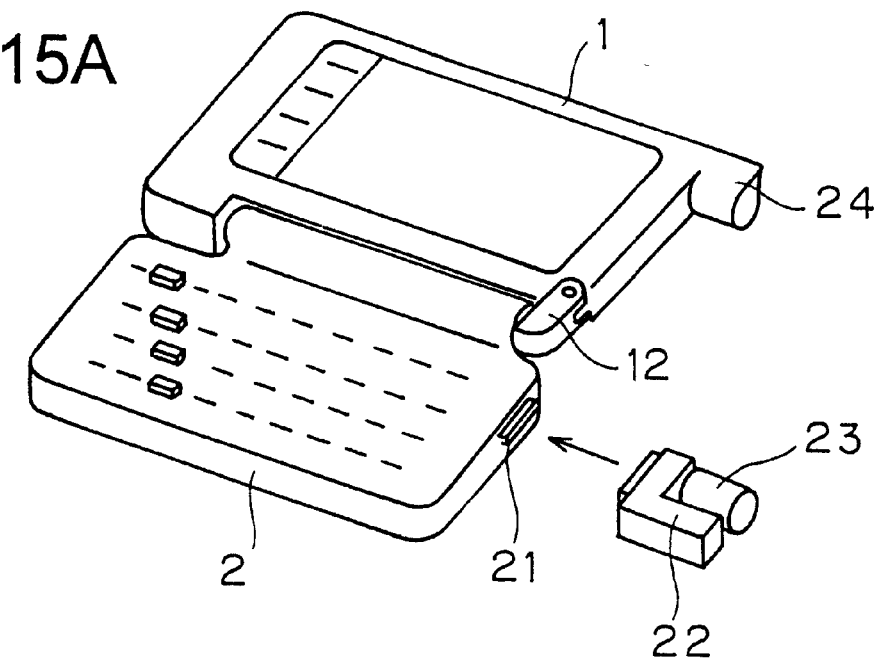
FIGS. 15A and 15B are external perspective views showing another example of how electrical connection is achieved using IR units in the second embodiment.
Figure 15B:
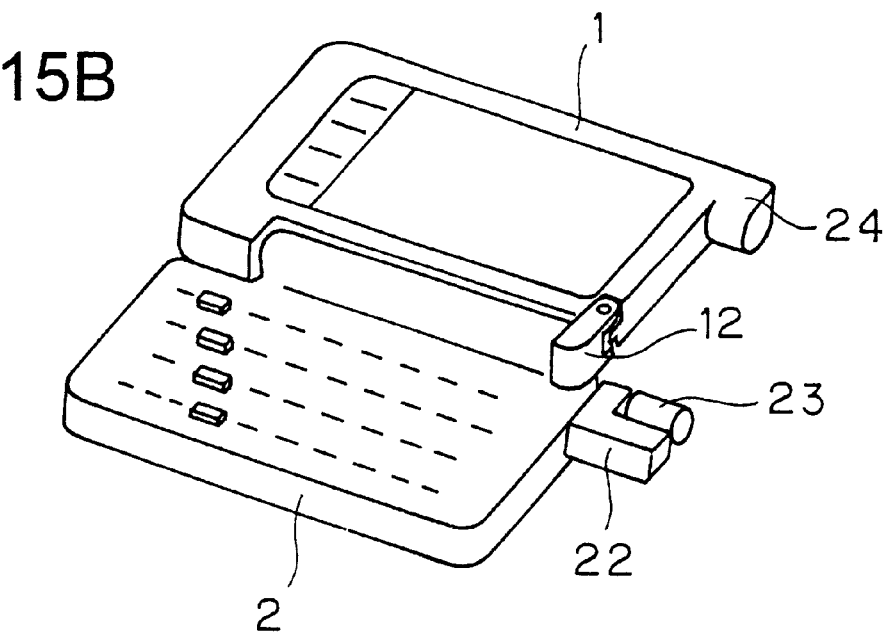

FIGS. 15A and 15B are external perspective views showing another example of how electrical connection is achieved using IR units in the pen-based entry electronic device of this embodiment. Here, as shown in FIG. 15A, on the side of the body 1, at a corner, a fixed IR unit 24 is provided, and, in the side of the keyboard 2, at a corner, an IR unit connector 21 is provided, to which an IR unit 22 is attached as indicated by an arrow. FIG. 15B shows how the IR unit 22 is attached to the IR unit connector 21. The IR unit 22 has an IR emitter/sensor portion formed as a rotatable portion 23. The rotatable portion 23 and the IR unit 24 communicate with each other through the exchange of infrared rays between them, and this permits the body 1 and the keyboard 2 to be connected together electrically.

Figure 16A:
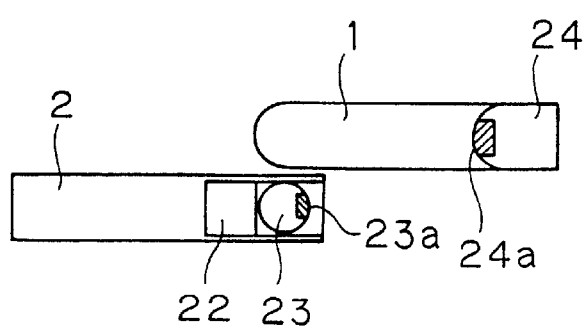
FIGS. 16A and 16B are external perspective views showing the electrical connection achieved by the IR units shown in FIGS. 15A and 15B.
Figure 16B:
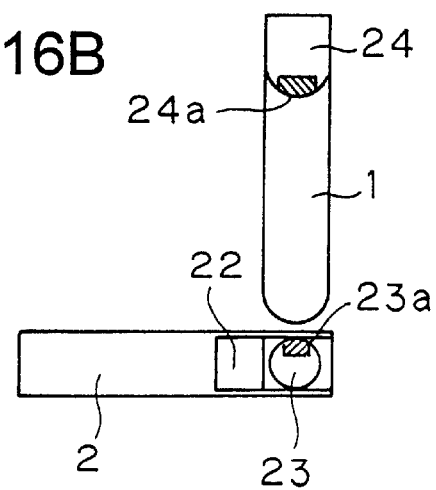

FIGS. 16A and 16B are external perspective views showing the electrical connection achieved by these IR units. FIG. 16A shows the body 1 and the keyboard 2 completely unfolded, and FIG. 16B shows the body 1 and the keyboard 2 unfolded to 90 degrees. As shown in these figures, when the body 1 is used at the desired angle, to make infrared communication possible, the rotatable portion 23 of the IR unit 22 attached to the keyboard 2 is manually rotated so that the window 23a of the rotatable portion 23 and the window 24a of the IR unit 24 face each other to suit the angle at which the body 1 is used. The connector 21 and the IR unit 24 may be provided in any other positions than specifically shown in FIGS. 15A and 15B as long as they achieve the desired electrical connection and do not hamper the operation of the electronic device; for example, they may be provided on the opposite side.

Figure 17A:
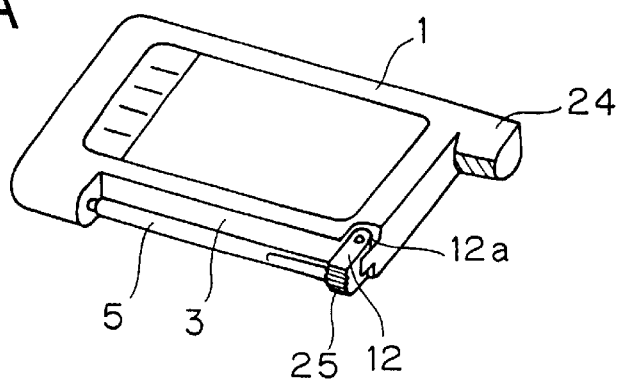
FIGS. 17A to 17C are external perspective views showing still another example of how electrical connection is achieved using IR units in the second embodiment.
Figure 17B:
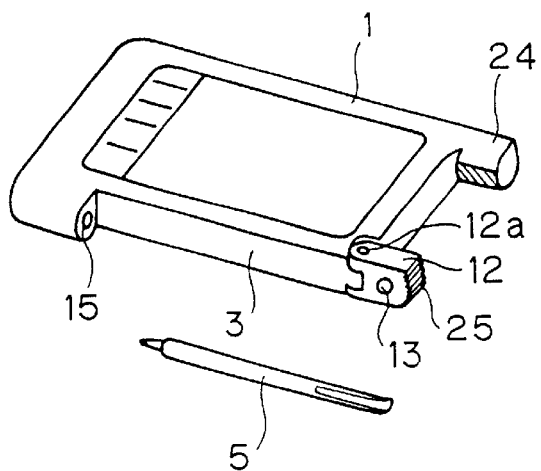
Figure 17C:
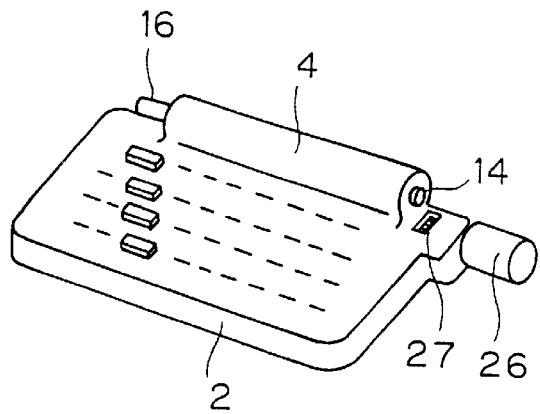

FIGS. 17A to 17C are external perspective views showing still another example of how electrical connection is achieved using IR units in the pen-based entry electronic device of this embodiment. The structure here is basically the same as the one shown in FIGS. 12A to 12D except for the following differences. On the side of the body 1, at a corner, a fixed IR unit 24 is provided, and, at the tip of the rotary stopper 12, a gear portion 25 is formed. On the other hand, in the side of the keyboard 2, at a corner, an IR unit 26 of a built-in type is provided, and, in the vicinity thereof, a rotation transmission gear 27 is provided. The IR unit 26 and the IR unit 24 communicate with each other through the exchange of infrared rays between them, and this permits the body 1 and the keyboard 2 to be connected together electrically.

When the keyboard 2 is fitted to the body 1, first, with the pen 5 removed as shown in FIG. 17B, the keyboard-side coupling portion 16 extending from one end of the fitting portion 4 of the keyboard 2 as shown in FIG. 17C is inserted into the body-side coupling portion 15. Then, the rotary stopper 12 is rotated through 90 degrees so that the circular projection 14 extending from the other end of the fitting portion 4 of the keyboard 2 is fitted into the circular depression 13 formed in the rotary stopper 12. This causes the gear portion 25 formed on the rotary stopper 12 to mesh with the rotation transmission gear 27 provided in the keyboard 2

Figure 18:
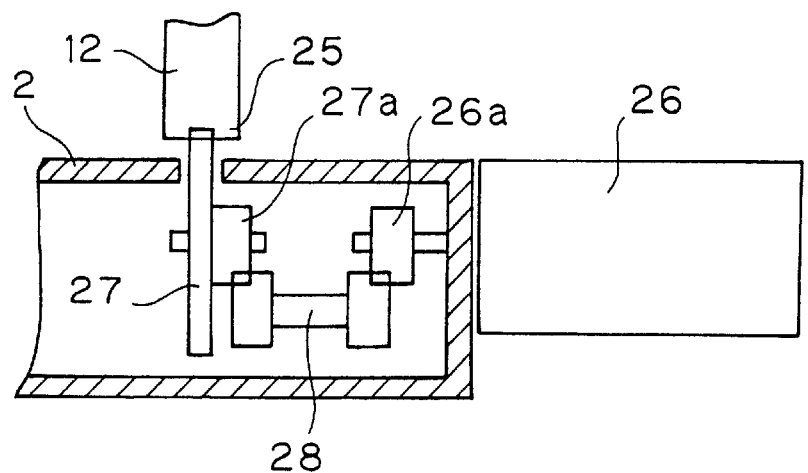
FIG. 18 is a diagram schematically showing the rotation drive/transmission mechanism built in the keyboard.

FIG. 18 is a diagram schematically showing the rotation drive/transmission mechanism built in the keyboard 2. As described above, the gear portion 25 formed on the rotary stopper 12 of the body 1 meshes with the rotation transmission gear 27 provided in the keyboard 2. Hence, when the body 1 is rotated to the desired angle with respect to the keyboard 2, the gear portion 25 rotates, and thus the rotation transmission gear 27 rotates together. As a result, a small gear 27a provided coaxially with the rotation transmission gear 27 rotates together. This rotation is transmitted through a relay gear 28 to a small gear 26a. As this small gear 26a rotates, the IR unit 26, which is provided coaxially therewith, rotates together.

Figure 19A:
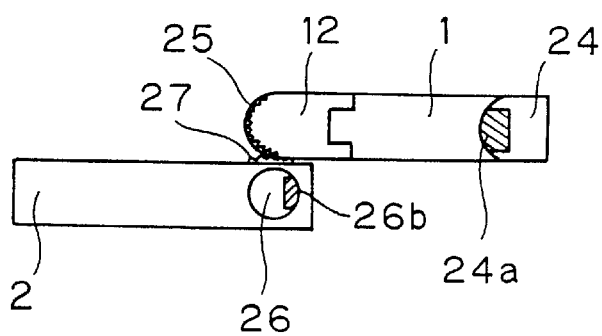
FIGS. 19A and 19B are external perspective views showing the electrical connection achieved by the IR units shown in FIGS. 17A to 17C.
Figure 19B:
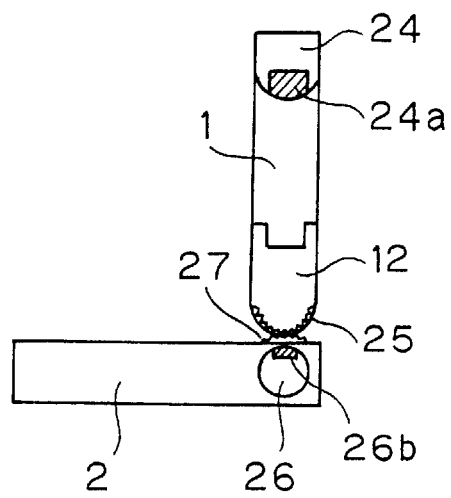

FIGS. 19A and 19B are external perspective views showing the electrical connection achieved by these IR units.

FIG. 19A shows the body 1 and the keyboard 2 completely unfolded, and FIG. 19B shows the body 1 and the keyboard 2 unfolded to 90 degrees. As shown in these figures, when the body 1 is used at the desired angle, the rotation drive/transmission mechanism described above automatically rotates the IR unit 26 built in the keyboard 2 to suit the angle at which the body 1 is used. This causes the window 26b of the IR unit 26 and the window 24a of the IR unit 24 to face each other, and thereby makes infrared communication possible.

FIGS. 20A to 20D are external perspective views showing how the keyboard is detachably attached to the body and showing a further example of how electrical connection is achieved in the pen-based entry electronic device of this embodiment. In FIGS. 20A to 20D, reference numeral 1 represents the body having substantially the shape of a panel, reference numeral 3 represents a pen holder slot formed along one side of the body 1, reference numeral 5 represents a pen that is carried along with the body 1, and reference numeral 12 represents a rotary stopper provided at a corner of the body 1. The body 1 is provided with, in the surface thereof, a display portion 30 including a tablet 30a for pen-based entry, and incorporates, although not illustrated, electronic circuits for controlling the electronic device, a battery for supplying electric power needed to drive those electronic circuits, and other components.

Figure 20A:
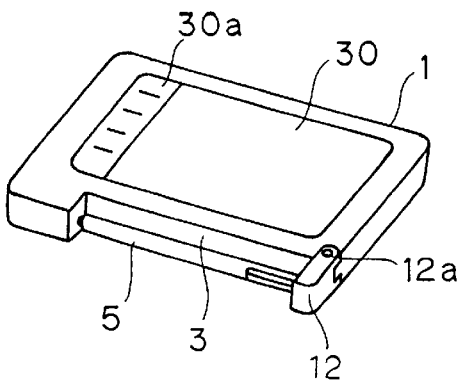
FIGS. 20A to 20D are external perspective views showing how the keyboard is detachably attached to the body and showing a further example of how electrical connection is achieved in the second embodiment.
Figure 20B:
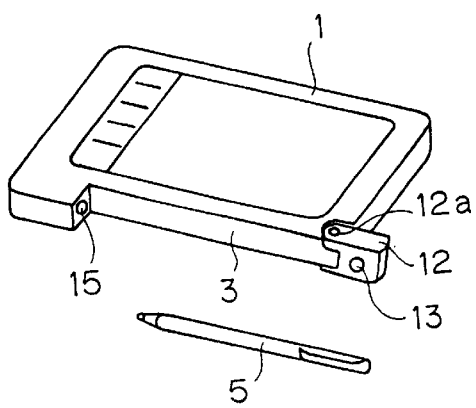

As shown in FIG. 20A, the pen 5 is held in the pen holder slot 3 by being sandwiched between the body 1 and the rotary stopper 12. To remove the pen 5, as shown in FIG. 20B, the rotary stopper 12 is rotated through 90 degrees about its rotation shaft 12a to release the pen 5. Here, reference numeral 15 represents a body-side coupling portion formed as a circular hole in the body 1, and reference numeral 13 represents a circular depression formed in the rotary stopper 12. When the pen 5 is held, the two ends thereof are respectively inserted in the body-side coupling portion 15 and the circular depression 13.

Figure 20C:
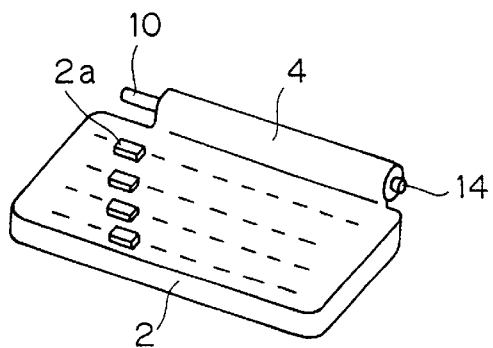

On the other hand, as shown in FIG. 20C, the keyboard 2 has various keys 2a provided in the surface thereof and has substantially the shape of a panel. The keyboard 2 has a fitting portion 4 formed along one side thereof. At one end of the fitting portion 4, a connection terminal portion 10 is formed as a cylindrical projection, and, at the other end of the fitting portion 4, a circular projection 14 is formed, both so as to extend from the respective ends of the fitting portion 4 outward. When the keyboard 2 is fitted to the body 1, first, with the pen 5 removed as shown in FIG. 20B, the connection terminal portion 10 extending from one end of the fitting portion 4 of the keyboard 2 shown in FIG. 20C is inserted into the body-side coupling portion 15.

Figure 20D:
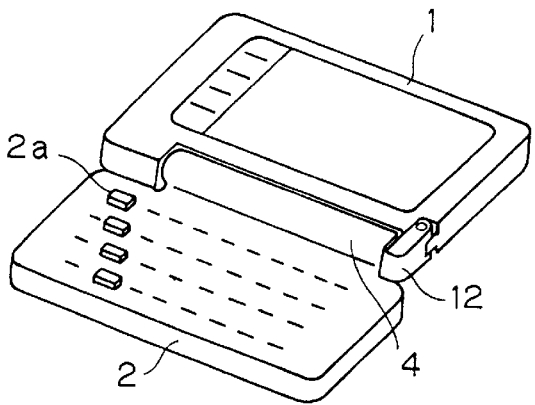

Then, the rotary stopper 12 is rotated through 90 degrees so that the circular projection 14 extending from the other end of the fitting portion 4 of the keyboard 2 is fitted into the circular depression 13 formed in the rotary stopper 12. In this state, the body-side coupling portion 15 and the circular depression 13 function as brackets for rotatably supporting the connection terminal portion 10 and the circular projection 14 respectively. FIG. 20D shows this state. In this state, as described later, the connection terminal portion 10 makes contact with a connection terminal portion 9 provided in the vicinity of the body-side coupling portion 15, and thereby connects the body 1 and the keyboard 2 together electrically.

FIGS. 21A and 21B are diagrams conceptually showing the electrical connection achieved here. When, as shown in FIG. 21A, the connection terminal portion 10 of the keyboard 2 is inserted in the body-side coupling portion 15 of the body 1 in the direction indicated by an arrow, then, as shown in FIG. 21B, individual terminals 9a of the connection terminal portion 9 that are provided in the vicinity of the body-side coupling portion 15 and that are formed as metal contacts shaped like flat springs make contact with individual terminals 10a provided in the connection terminal portion 10, and thereby connect the body 1 and the keyboard 2 together electrically.

Figure 22A:
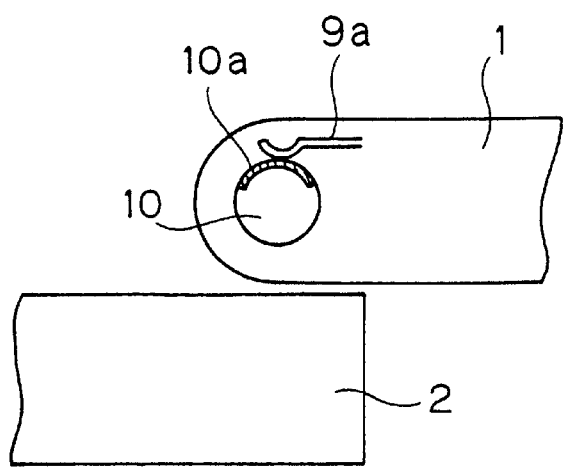
FIGS. 22A and 22B are sectional views taken along line D—D shown in FIG. 21B.
Figure 22B:
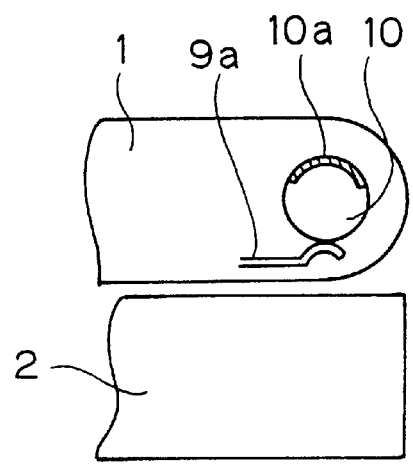

FIGS. 22A and 22B are sectional views taken along line D—D shown in FIG. 21B. FIG. 22A shows the body 1 and the keyboard 2 completely unfolded, and FIG. 22B shows the body 1 and the keyboard 2 folded together. As shown in these figures, by making the connection terminal portion 10 cylindrical, it is possible to rotate the body 1 and the keyboard 2 with respect to each other about this portion where electrical connection is achieved. Moreover, by limiting the range in which the terminals 10a are formed on the periphery of the connection terminal portion 10, it is possible to turn electrical connection on and off automatically.

Specifically, it is possible to adopt an arrangement in which, as shown in FIG. 22A, when the body 1 and the keyboard 2 are unfolded, the terminals 9a of the connection terminal portion 9 make contact with the terminals 10a of the connection terminal portion 10 and thereby achieve electrical connection and, as shown in FIG. 22B, when the body 1 and the keyboard 2 are folded together, the terminals 9a of the connection terminal portion 9 break contact with the terminals 10a of the connection terminal portion 10 and thereby break electrical connection.

Figure 23A:
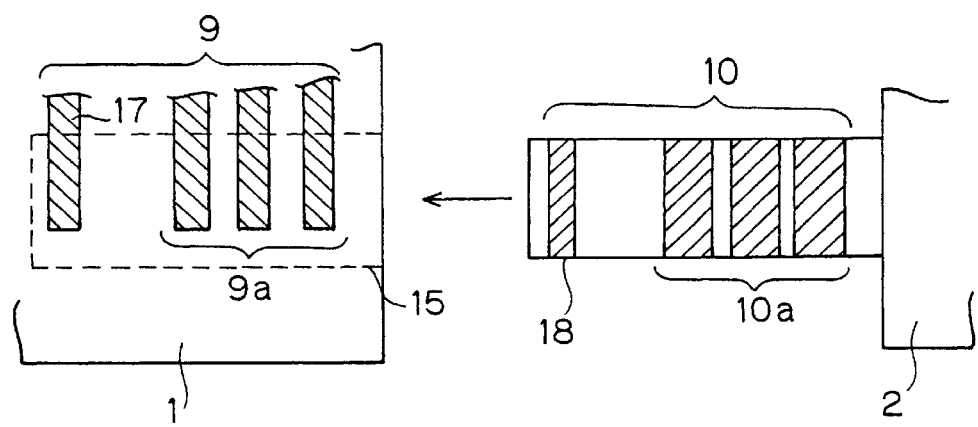
FIGS. 23A to 23C are diagrams schematically showing the arrangement of the terminals in the connection terminal portions of the body and the keyboard and the process by which those terminals achieve electrical connection.
Figure 23B:
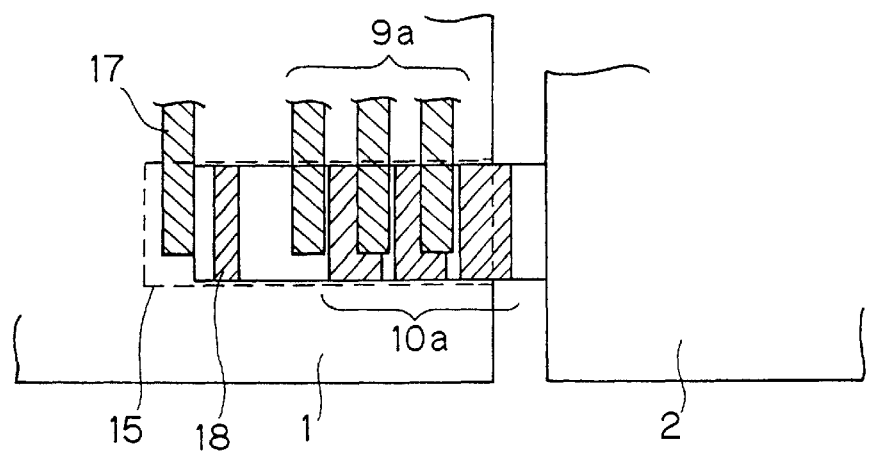
Figure 23C:
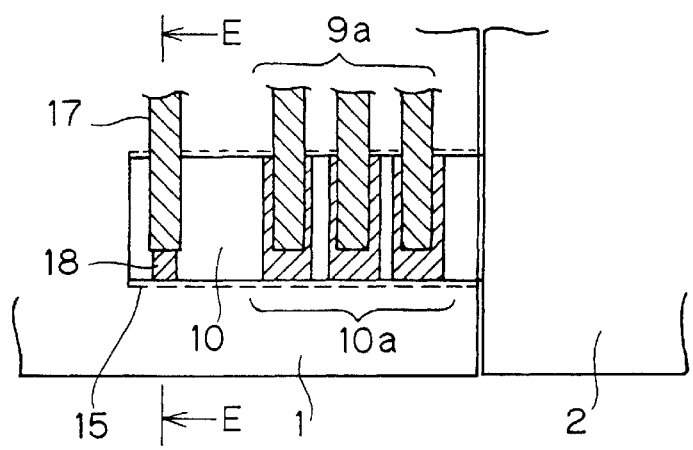

FIGS. 23A to 23C are diagrams schematically showing the arrangement of the terminals in the connection terminal portions of the body and the keyboard and the process by which those terminals achieve electrical connection. FIG. 23A shows the terminals before connection, FIG. 23B shows the terminals in the process of being connected, and FIG. 23C shows the terminals connected together. As shown in these figures, in the connection terminal portion 9 of the body 1, a power terminal 17 for supplying electric power to the keyboard is provided in the innermost position, somewhat away from the other terminals 9a. On the other hand, in the connection terminal portion 10 of the keyboard 2, a power terminal 18 for supplying electric power to the keyboard is provided at the tip, somewhat away from the other terminals 10a.

To achieve electrical connection, first, as shown in FIG. 23A, the connection terminal portion 10 of the keyboard 2 is inserted in the body-side coupling portion 15 of the body 1 in the direction indicated by an arrow. As a result, by way of the intermediary state shown in FIG. 23B, eventually the power terminal 17 provided in the connection terminal portion 9, which is formed as a metal contact having the shape of a flat spring in the vicinity of the body-side coupling portion 15, makes contact with the power terminal 18 provided in the connection terminal portion 10, and the other terminals 9a and 10a make contact with each other individually. In this way, the body 1 and the keyboard 2 are connected together electrically.

As described above, the power terminals are provided at the ends, somewhat away from the other terminals. Hence, even when the other terminals make contact with each other in the intermediary state as shown in FIG. 23B, no electric power is supplied to the keyboard 2 until the power terminals 17 and 18 make contact with each other. This helps avoid malfunctioning during the fitting process. That is, the power terminals do not make contact with each other to permit proper operation of the keyboard 2 until the connection terminal portion 10 is inserted completely in the body-side coupling portion 15. On the other hand, when the keyboard 2 is detached from the body 1, the power terminals 17 and 18 break contact first. This helps prevent malfunctioning during the detachment process. The arrangement of terminals described above can be used also in the example of electrical connection shown in FIGS. 8A and 8B described in connection with the first embodiment.

Figure 24A:
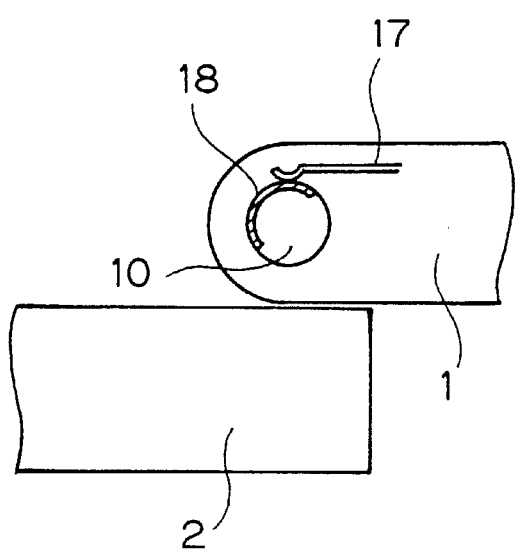
FIGS. 24A and 24B are sectional views taken along line E—E shown in FIG. 23C.
Figure 24B:
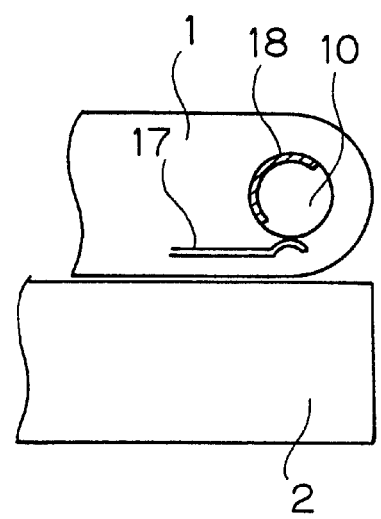

FIGS. 24A and 24B are sectional views taken along line E—E shown in FIG. 23C. FIG. 24A shows the body 1 and the keyboard 2 completely unfolded, and FIG. 24B shows the body 1 and the keyboard 2 folded together. As shown in these figures, by limiting the range in which the power terminal 18 is formed on the periphery of the connection terminal portion 10, it is possible to turn electrical connection on and off automatically.

Specifically, for example, as shown in FIG. 24A, when the body 1 and the keyboard 2 are unfolded, the power terminal 17 of the connection terminal portion 9 makes contact with the power terminal 18 of the connection terminal portion 10, and thereby achieves electrical connection. On the other hand, as shown in FIG. 24B, when the body 1 and the keyboard 2 are folded together, the power terminal 17 of the connection terminal portion 9 breaks contact with the power terminal 18 of the connection terminal portion 10, and thereby breaks electrical connection. Here, electrical connection is achieved also when the body 1 and the keyboard 2 are unfolded to 90 degrees (not shown).

Figure 25A:
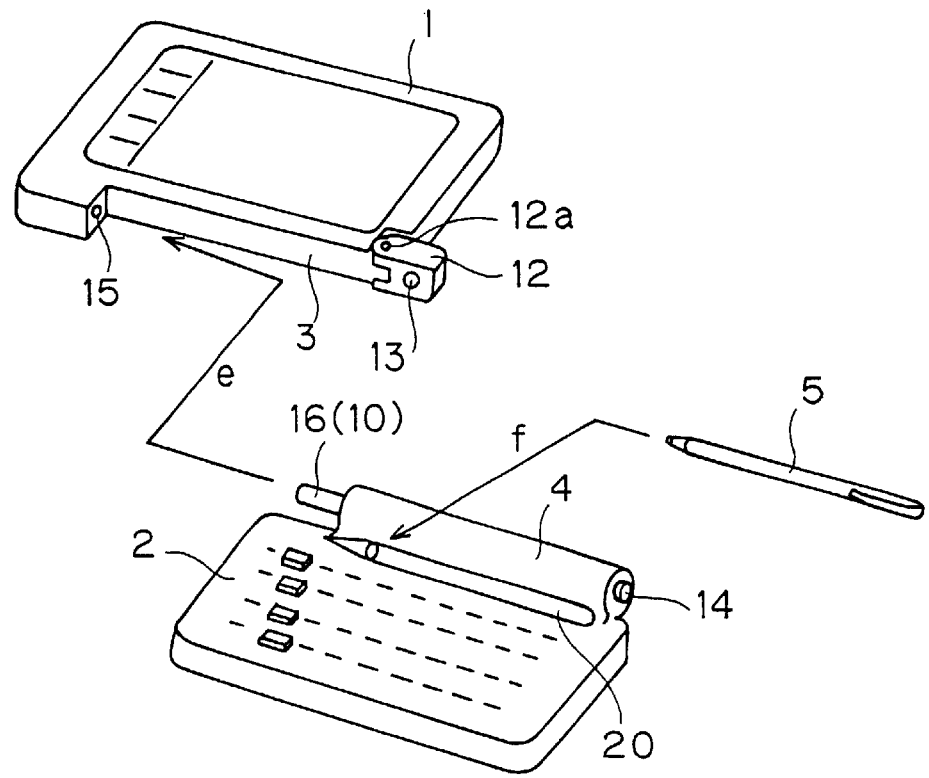
FIGS. 25A and 25B are external perspective views showing an example of how the pen is held in the second embodiment.
Figure 25B:
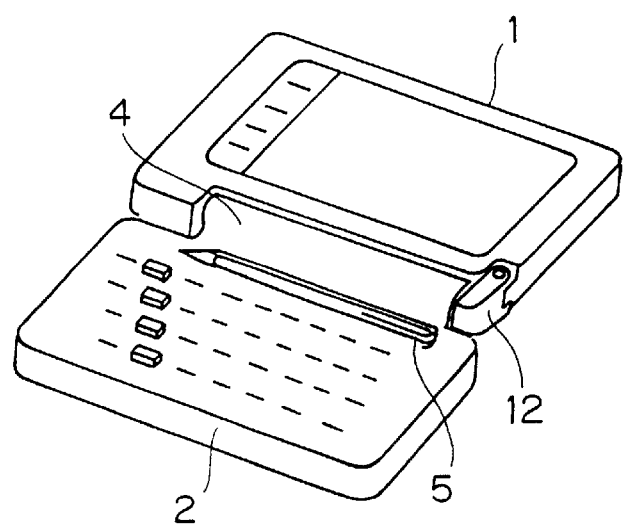

FIGS. 25A and 25B are external perspective views showing an example of how the pen is held in the pen-based entry electronic device of this embodiment. In FIG. 25A, when the keyboard 2 is fitted to the body 1, as described previously, first, with the pen 5 removed, the keyboard-side coupling portion 16 (or the connection terminal portion 10) extending from one end of the fitting portion 4 of the keyboard 2 as shown in FIG. 25A is inserted into the body-side coupling portion 15 as indicated by an arrow "e". Then, the rotary stopper 12 is rotated through 90 degrees so that the circular projection 14 extending from the other end of the fitting portion 4 of the keyboard 2 is fitted into the circular depression 13 formed in the rotary stopper 12.

Now, the pen 5 taken out of the pen holder slot 3 is held, as indicated by an arrow "f", in a pen holder space 20 formed in the surface of the keyboard 2. The pen holder space 20 may be formed in any other position in the surface of the keyboard 2 than specifically shown in FIG. 25A as long as it does not hamper the operation of the electronic device. Moreover, when the body 1 and the keyboard 2 are folded together, the pen 5 is sandwiched between them. This makes it possible to carry the pen 5 along with the body 1 and the keyboard 2 without any risk of the pen 5 dropping out.

What is claimed is:

1. A pen-based entry electronic device comprising:

a body having a holder portion for holding a pen that is carried along with the body; and a keyboard having an engagement portion that engages with the holder portion;

wherein each of the pen and the keyboard are removably attachable to the body via the holder portion, so that only one of the pen and the keyboard can be attached to the body at a given time via the holder portion.

2. A pen-based entry electronic device as claimed in claim 1, wherein the body and the keyboard are connected together electrically via a connection cable.

3. A pen-based entry electronic device as claimed in claim 1,
wherein the body and the keyboard are connected together electrically via infrared communication.

4. A pen-based entry electronic device as claimed in claim 1,
wherein the holder portion and the engagement portion are each provided with connection terminals so that, when the engagement portion engages with the holder portion, the connection terminals make contact with each other to connect the body and the keyboard together electrically.

5. A pen-based entry electronic device as claimed in claim 4,
wherein the connection terminals provided on the holder portion and the engagement portion are so arranged that, when the holder portion engages with the engagement portion, power terminals among all the connection terminals make contact with each other last and that, when the holder portion disengages from the engagement portion, the power terminals among all the connection terminals break contact with each other first.

6. A pen-based entry electronic device as claimed in claim 1,
wherein a holder space for holding the pen is secured in a surface of the keyboard that faces the body when the body and the keyboard are folded together.

7. A pen-based entry electronic device as claimed in claim 1,
wherein, when the engagement portion engages with the holder portion, the body and the keyboard are rotatable about each other.

8. A pen-based entry electronic device as claimed in claim 7,
wherein the body and the keyboard are connected together electrically via a connection cable.

9. A pen-based entry electronic device as claimed in claim 7,
wherein the body and the keyboard are connected together electrically via infrared communication.

10. A pen-based entry electronic device as claimed in claim 9,
wherein, according to an angle that the body and the keyboard form with each other, orientation of infrared units fitted individually on the body and the keyboard is adjusted automatically so that the infrared units keep substantially facing each other.

11. A pen-based entry electronic device as claimed in claim 7,
wherein the holder portion and the engagement portion are each provided with connection terminals so that, when the engagement portion engages with the holder portion, the connection terminals make contact with each other to connect the body and the keyboard together electrically.

12. A pen-based entry electronic device as claimed in claim 11,
wherein the connection terminals provided on the holder portion and the engagement portion are so arranged that, when the holder portion engages with the engagement portion, power terminals among all the connection terminals make contact with each other last and that, when the holder portion disengages from the engagement portion, the power terminals among all the connection terminals break contact with each other first.

13. A pen-based entry electronic device as claimed in claim 11,
wherein power is turned off when the body and the keyboard are folded together, and power is turned on when the body and the keyboard are unfolded.

14. A pen-based entry electronic device as claimed in claim 1,
wherein a holder space for holding the pen is secured in the keyboard.

15. The pen-based entry electronic device of claim 1, wherein the holder portion comprises an elongated aperture defined in the body.

16. The pen-based entry electronic device of claim 15, wherein said elongated aperture is open at least at one side thereof so that when the pen is being held in the aperture at least one elongated side portion of the pen is exposed.

17. The pen-based entry electronic device of claim 1, wherein the holder comprises a space located between a movable stopper portion (11 or 12) and an aperture (15) defined in the body, wherein the aperture is for receiving a top portion of the pen.

18. An electronic device comprising:
a body including a display portion that comprises an input area adapted to receive input from a pointing device which can manipulated by a user;
a holder portion for holding the pointing device, said holder portion being part of the body;
a keyboard having an engagement portion that engages with the holder portion; and
wherein each of the pointing device and the keyboard are removably attachable to the body via the holder portion, so that only one of the pointing device and the keyboard can be attached to the body at a given time via the holder portion.

19. The electronic device of claim 18, wherein the engagement portion of the keyboard includes an elongated portion that fits into an aperture of the holder portion.

20. The electronic device of claim 18, wherein the holder portion comprises an elongated aperture defined in the body.

21. The electronic device of claim 20, wherein said elongated aperture is open at least at one side thereof so that when the pointing device is being held in the aperture at least one elongated side portion of the pointing device is exposed.

* * * * *